(12) United States Patent
Lewis et al.

(10) Patent No.: US 6,716,969 B1
(45) Date of Patent: Apr. 6, 2004

(54) REACTIVE DYE COMPOUNDS

(75) Inventors: David Malcolm Lewis, Otley (GB); Wei Dong He, Leeds (GB); Taher Iqbal Yousaf, Egham (GB); Gilles Yves Maria Fernand Genain, London (GB)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/009,084

(22) PCT Filed: May 10, 2000

(86) PCT No.: PCT/US00/12750
§ 371 (c)(1),
(2), (4) Date: Nov. 8, 2001

(87) PCT Pub. No.: WO00/69974
PCT Pub. Date: Nov. 23, 2000

(30) Foreign Application Priority Data

May 19, 1999 (GB) ............................................. 9911690

(51) Int. Cl.⁷ ..................... C09B 62/503; C09B 62/507; D06P 1/384
(52) U.S. Cl. ............................. 534/642; 8/404; 8/428; 8/549
(58) Field of Search ........................................ 534/642

(56) References Cited

U.S. PATENT DOCUMENTS

| | | |
|---|---|---|
| 3,116,275 A | 12/1963 | Gamlen et al. |
| 3,377,336 A | 4/1968 | Siegel et al. |
| 3,433,781 A | 3/1969 | Ackerman et al. |
| 3,522,246 A | 7/1970 | Siegel et al. |
| 3,527,760 A | 9/1970 | Siegel et al. |
| 3,873,513 A | 3/1975 | Kullman et al. |
| 4,092,478 A | 5/1978 | Plant et al. |
| 4,098,784 A | 7/1978 | Swidler et al. |
| 4,139,345 A | 2/1979 | Crabtree et al. |
| 4,150,021 A | 4/1979 | Swidler et al. |
| 4,832,698 A | 5/1989 | Ikeou et al. |
| 4,855,411 A | 8/1989 | Thompson et al. |
| 4,898,933 A | 2/1990 | Schläfer et al. |
| 5,037,449 A | 8/1991 | Hoegerle et al. |
| 5,175,263 A | 12/1992 | Schläfer et al. |
| 5,548,071 A | 8/1996 | Deitz et al. |
| 5,766,267 A | 6/1998 | Schumacher et al. |
| 5,877,310 A | 3/1999 | Reddington et al. |
| 6,350,862 B1 | 2/2002 | Brock et al. |
| 6,398,822 B1 | 6/2002 | Brock et al. |

FOREIGN PATENT DOCUMENTS

| | | |
|---|---|---|
| CA | 771632 | 11/1967 |
| DE | 33 35 956 A1 | 4/1985 |
| DE | 196 45 601 A | 5/1998 |
| EP | 033527 * | 8/1981 |
| EP | 0 260 806 A2 | 3/1988 |
| EP | 0 735 107 A2 | 9/1990 |
| EP | 0 418 623 A1 | 3/1991 |
| FR | 1 274 732 A | 2/1962 |
| GB | 949 316 A | 2/1964 |
| GB | 1 020 304 | 2/1966 |
| GB | 1 060 734 | 3/1967 |
| GB | 1 275 944 | 6/1972 |
| GB | 1 414 420 A | 11/1975 |
| JP | 60 208 367 | 10/1985 |
| JP | 63 006 181 | 1/1988 |
| WO | WO-96/02593 | 2/1996 |
| WO | WO 97 19188 A | 5/1997 |
| WO | WO 99/51685 | 10/1999 |
| WO | WO 99/51686 | 10/1999 |
| WO | WO 99/51689 | 10/1999 |
| WO | WO 00/69973 | 11/2000 |
| WO | WO 01/25336 | 4/2001 |
| WO | WO 01/25337 | 4/2001 |
| WO | WO 01/25338 | 4/2001 |
| WO | WO 01/25339 | 4/2001 |

OTHER PUBLICATIONS

I. Grabtchev, "The Synthesis and Properties of some Triazine–stilbene Fluorescent Brighteners", Dyes Pigm., 1994, pp. 249–254, 25.

The Journal of Macromelecular Chemistry, 1976, 50, pp. 1–8, 728.

The Journal of Macromelecular Chemistry, 1977, 64, pp. 205–210, 951.

S. Horrobin, "The Hydrolysis of Some Chloro–1,3,5–Triazines", The Journal of the Chemical Society, 1963, pp. 4130–4144.

F. Lehr, "Synthesis and Application of Reactive Dyes with Heterocyclic Reactive Systems," Jan. 19, 1990, pp. 239–263.

* cited by examiner

Primary Examiner—Fiona T. Powers
(74) Attorney, Agent, or Firm—Jenkins, Wilson & Taylor, P.A.

(57) ABSTRACT

A reactive dye compound comprising:
(a) at least one chromophore moiety
(b) at last one $SO_2C_2H_4$ group which is attached to the chromophore moiety either direcly via the sulphur atom of the $SO_2C_2H_4$ group or a linking group L;
characterized in that at least one $SO_2C_2H_4$ group is substituted on its terminal carbon atom with at least one Y group wherein Y is —A(CO)R* wherein A is selected from O or S and wherin R' contains at least one terminal nucleophilic group, such as OH, $NH_2$, SH, COOH, N, $NHR^1$ and $NR^1R^2$ wherein $R^1$ and $R^2$ may be the same of different and may be selected from C1–C4 alkyl; and salts therof. Also claimed is a process of manufacture of the compounds herein and products obtainable by the process.

The compounds herein have high Exhaustion Values (E), high Fixation Values (F) and high Efficiency Values (T) and show significant improvements in terms of reducing spent dyestuff in effluent increasing dye affinity to the substrate, increasing the dye-substrate covalent bonding, increasing the ability to dye substrates at room temperature, decreasing the amount of dye that is removed during the post dyeing "soaping off process" and therefore simplifying the post dyeing "soaping off process" traditionally associated with dyeing cotton with fibre reactive dyes and reduction of staining of adjacent white fabrics. In addition, the compounds prepared above provide more intense dyeings and require less levels of salt for dyeing cotton substrate.

26 Claims, No Drawings

REACTIVE DYE COMPOUNDS

TECHNICAL FIELD

The present invention relates to reactive dye compounds. In particular the present invention relates to reactive dye compounds having improved dye-bath Exhaustion (E) and improved dye-fibre covalent Fixation (F).

BACKGROUND OF THE INVENTION

Reactive dye compounds are known in the art for dyeing various substrates. Such substrates include for example proteinaceous materials such as keratin, e.g. found in hair, skin and nails and various animal body parts such as horns, hooves and feathers, and other naturally occurring protein containing materials, e.g. silk and saccharide-derived materials such as those derived from cellulose or cellulose derivatives, e.g. natural products such as cotton, and synthetic fibres such as polyamides.

Examples of classes of such reactive dyes which are well known in the art include dyes containing a vinyl sulphone group or vinyl sulphone precursor groups such as those commercially available from Dystar under the tradename Remazol.

There are many different types of commercially-available reactive dyes for dyeing cellulosic and polyamide-type substrates. However, a critical problem still filing the textile dye industry today is the significant level of dyestuff material which remains in the effluent waste water after the dyeing process is finished. The industry measure for this problem is known as dye-bath Exhaustion (E). A high Exhaustion value for a particular dye compound means that a low level of spent dye renains in the effluent after the dyeing process is complete, while a low Exhaustion value means that a high level of spent dye remains in the effluent. There is clearly a need therefore for new dye compounds which have higher Exhaustion Values compared with commercially available dye compounds, and which provide benefits in terms of reducing levels of spent dyestuff in effluent water.

As well as having a high Exhaustion Value, it is also important for a dye compound to have a high dye-fibre covalent Fixation Value (F). The Fixation Value (F) of a reactive dye compound is a measure of the extent of covalent bonding with the substrate based on the dye originally absorbed during the dyeing process. Thus 100% Fixation means that 100% of the absorbed dye covalently bonds to the substrate. Thus, there is clearly a need to provide dye compounds having increased Fixation Values. A high Fixation Value can result in a simplification of the post dyeing "soaping off process" traditionally associated with fiber reactive dye compounds. In particular, a high Fixation Value can result in a reduced time spent on the "soaping off process" together with a reduced cost.

It has now been surprisingly found that a new class of fibre reactive dye compounds derived from vinyl sulphone dyes and their precursors such as chloroethylsulphone, sulphatoethylsulphone, phosphoethylsulphone, and other blocked ethyl sulphones as known in the art, comprising at least one chromophore group, at least one $SO_2C_2H_4$ group and at least one $A(C{=}O)R^*$ group, such as citrate, exhibit significantly increased values of Exhaustion (E) and Fixation (F). These dyes can be used on a wide variety of substrates. They are particularly useful for cellulosic substrates, such as cotton, and show significant improvements in terms of decreasing the amount of spent dyestuff in effluent, increasing dye affinity to the substrate, increasing the efficiency of the dye-substrate covalent reaction, and simplifying the post dyeing "soaping off process" traditionally associated with reactive dyes. In addition, the compounds of the present invention provide significantly more intense dyeings, and can be used for both high and low temperature dyeing, hence reducing the cost of the dyeing process. Furthermore, the compounds of the present invention can be used together with specific chromophores for cellulose substrate dyeing leading to significantly reduced levels of salt needed for dyeing.

SUMMARY OF THE INVENTION

According to the present invention there is provided a reactive dye compound comprising:
(a) at least one chromophoric moiety
(b) at least one $SO_2C_2H_4$ group which is attached to the chromophoric moiety either directly via the sulphur atom of the $SO_2C_2H_4$ group or via a linking group L; characterised in that at least one $SO_2C_2H_4$ group is attached to at least one Y group on its terminal carbon atom wherein Y is —A(CO)R*, wherein A is selected from O or S, preferably O, and wherein R* is an organic residue which contains at least one nucleophilic group, wherein the nucleophilic group is preferably selected from OH, $NH_2$, SH, COOH, —N—, $NHR^1$ and $NR^1R^2$ wherein $R^1$ and $R^2$ may be the same of different and may be selected from $C_1$–$C_4$ alkyl.

The compounds of the present invention exhibit increased Exhaustion (E), Fixation (F) and Efficiency (T) values and provide improvements in terms of reducing spent dyestuff in effluent, increasing dye affinity to the substrate, increasing the efficiency of the dye-substrate covalent reaction, ability to cany out the long-liquor dyeing process at room temperature as well as at elevated temperatures, and simplifying the post dyeing "soaping off process" traditionally associated with fiber reactive dyes. In addition, the compounds of the present invention provide significantly more intense dyeings, i.e. greater colour intensity in the dyed substrate, without compromising levelness. Typical Exhaustion Values for the compounds and products herein are greater than 95%. Typical Fixation Values for the compounds and products herein are greater than 95%.

DETAILED DESCRIPTION OF THE INVENTION

As used herein the term "reactive dye" means a dye containing one or more reactive groups, capable of forming covalent bonds with the substrate to be dyed, or a dye which forms such a reactive group in situ.

As used herein the term "Exhaustion" in relation to reactive dyes means the percentage of dye which is transferred from a solution of the dye to the substrate to be treated at the end of the dyeing process, before rinsing and soaping. Thus 100% Exhaustion means that 100% of the dye is transferred from the dye solution to the substrate.

As used herein the term "fixation" in relation to reactive dyes means the percentage of dye which covalently bonds with the substrate, based on the dye originally absorbed during the dyeing process. Thus 100% Fixation means that 100% of the dye absorbed is covalently bonded with the substrate.

The total efficiency of reactive dyes can be measured by their Efficiency Value (T) which can be calculated from the Exhaustion Value (E) and Fixation Value (F) using the following equation:

$$\%T = (F \times E)/100$$

The compounds of the present invention comprise a chromophoric moiety, at least one $SO_2C_2H_4$ group linked to the chromophore group either directly via the sulphur atom or via a linking group L and a A(C=O)R* group wherein A is selected from O or S, and R* is an organic residue comprising at least one nucleophilic group.

Chromophoric Moiety

The reactive dye compounds herein can comprise one or more chromophoric moieties (O). In reactive dye compounds comprising two or more chromophoric moieties these can be the same or different. Preferably the reactive dye compounds herein comprise from one to three chromophoric moieties, preferably one or two chromophoric moieties, preferably one.

Any chromophoric moieties suitable for use for dyeing substrates can be used in the present invention. The term chromophore as used herein means any photoactive compound and includes any coloured or non-coloured light absorbing species, e.g. fluorescent brighteners, UV absorbers, IR absorbing dyes.

Suitable chrornophoric moieties for use in the dye compounds herein include the radicals of monoazo, disazo or polyazo dyes or of heavy metal complex azo dye derived therefrom or of an anthraquinone, phthalocyanine, fonnazan, azomethine, dioxazine, phenazine, stilbene, triphenylmethane, xanthene, thioxanthene, nitroaryl, naphthoquinone, pyrenequinone or perylenetetracarbimide dye.

Suitable chromophoric moieties for use in the dye compounds herein include those disclosed in EP-A-0,735,107 (Ciba-Geigy), incorporated herein by reference, including the radicals described therein which contain substituents customary for organic dyes, such as sulphonate substituents which enhance the water solubility of the dye compound.

Most preferred chromophoric D groups for use herein are polysulphonated azo chromophores such as those present in Procion (RTM) dyes commercially available from BASF, Drimalan (RTM) dyes commercially available from Clariant, Drimarene (RTM) dyes commercially available from Clanant and Levafix (RTM) and Remazol (RTM) commercially available from Dystar.

A(C=O)R* group

At least one of the $SO_2C_2H_4$ groups is substituted on the terminal carbon atom with at least one —A(C=O)R* group wherein A is selected from O Se or S, preferably S or O, more preferably O, wherein R* is an organic residue containing at least one nucleophilic group. As used herein the term "nucleophilic group" means a negative ion or any neutral molecule that has an unshared electron pair. Suitable nucleophilic groups herein include OH, $NH_2$, SH, COOH, —N=, $NHR^1$ and $NR^1R^2$ wherein $R^1$ and $R^2$ may be the same of different and may be selected from $C_1$–$C_4$ alkly.

Suitable R* groups for use herein are alkyl or aryl residues which contain at least one nucleophilic group. Preferably the R* groups herein are selected from the following groups each substituted with or containing at least one nucleophilic group: substituted or unsubstituted, straight chain or branched chain $C_1$–$C_8$ alkyl, substituted or unsubstituted straight chain or branched chain $C_2$–$C_8$ alkenyl having at least one olefinic group, substituted or unsubstituted, saturated or unsaturated or aromatic 3–9 atom monocyclic carbocycle or substituted or unsubstituted, saturated or unsaturated or aromatic 7–17 polycyclic carbcycle, substituted or unsubstituted, saturated or unsaturated or aromatic 3–9 atom monocyclic heterocycle or substituted or unsubstituted, saturated or unsaturated or aromatic 7–17 atom polycyclic heterocycle, wherein said heterocycle has one or more heteroatoms selected from O, N or S.

In the definition of R* above, where the term "substituted" is used such substitution may be with one or more substituents. Such substituents include, but are not limited to, those listed in C. Hansch and A. Leo, *Substituent Constants for Correlation Analysis in Chemistry and Biology* (1979), hereby incorporated by reference herein. Preferred substituents include, but are not limited to, alkyl, alkenyl, alkoxy, hydroxy, oxo, amino, aminoalkyl (e.g. aminomethyl, etc.), cyano, halo, carboxy, alkoxyacetyl (e.g. carboethoxy, etc.), thio, aryl, cycloalkyl, heteroaryl, hetcrocycloalkyl, (e.g.piperidinyl, morpholinyl, piperazinyl, pyrrolidinyl, etc.), imino thioxo, hydroxyalkyl, aryloxy, arylalkyl, and combinations thereof.

Preferred R* groups for use herein include, but are not limited to, $CF_3$, $(CH_2)_nSH$, $(CH_2)_nNH_2$, $CH(CH_3)OH$, $C(OH)(CH_2COOH)_2$, $CH_2C(OH)(CO_2H)CH_2COOH$, 2-aminophenyl, 2-hydroxynaphthyl 2-pyrrolidyl, $CH_2SSCH_2CO_3^-$, $(CH_2)_n$—$SO_3^-$, $C(OH)(H)CH2COOH$, $CH2C(H)(OH)COOH$, $C(OH)(H)C(OH)(H)COOH$, derivatives of hydroxy carboxylic acid polymerisation (e.g. in the case of polymerisation of two lactic acid molecules R* is $CH(CH_3)O(CO)CH(CH_3)OH)$, $(CH_2)_nNHR_1$, $CH_2NH_1R_2$, $CH_2NHNH_2$, $CH_2NHOH$, $CH_2SMe$, $CH(NH_2)(CH_2)_n(COOH)$, $CH(NH_2)CH_2SMe$, $CH(NH_2)CH_2SSCH_2CH(NH_2)COOH$, $CH(NH_2)CH_2SO_3H$, $C_6H_4OH$, $C_6H_4COOH$, $C_6H_4NH_2$, $C_5H_4N$, $(CH_2)_nC_5H_4N$, $CH(R\#)NH_2$, $(CH_2)_n$—$SSO_3^-$, $(CH_2)_n$—S—S—$(CH_2)_n$, —$C(OH)(COOH)CH_2COOH$, peptide or polypeptide, wherein $R_1$ and $R^2$ is independently selected from $C_1$–$C_4$ alkyl, wherein n is an integer in the range of 1 to 4 wherein within the same molecule n is not necessarily the same integer and where R# corresponds to an amino acid sidechain. For examples of such amino acids, cf. "Organic Chemistry" by Graham Solomons, 5th Edition, Wiley, N.Y., 1992, p1094–1095.

Preferred R* groups for use herein are selected from $(CH_2)_nSH$, $(CH_2)_nNH_2$, $C_5H_4N$, $CH(CH_3)OH$, $C(OH)(CH_2COOH)_2$, $CH_2C(OH)(COOH)CH_2COOH$, $CH(R\#)NH_2$, $CH(CH_3)OH$, $CH(OH)CH_2COOH$, $CH_2C(H)(OH)COOH$, $C(H)(OH)C(H)(OH)COOH$, $C_6H_4OH$, $C_6H_4NH_2$ and $C_5H_4N$.

Particularly preferred R* groups herein are groups derived from hydroxy carboxylic acids such as citric acid, lactic acid, tataric acid, malic acid, salicylic acid, and the like, including structural isomers thereof (e.g. in the case of citric acid R* can be $C(OH)(CH_2COOH)_2$ and $CH_2C(OH)(COOH)CH_2COOH$) and polymers thereof (e.g. in the case of polymerisation of two lactic acid molecules R* is $CH(CH_3)O(CO)CH(CH_3)OH$.

Particularly preferred R* group from the viewpoint of providing reactive dye compounds having excellent dye properties are those derived from citric acid, including $C(OH)(CH_2COOH)_2$ and $CH_2C(OH)(COOH)CH_2COOH$. It will be understood by those skilled in the art that in the case of unsymmetrical compounds having more than one carboxylic acid group, for example, citric acid and malic acid, that a mixture of dye compounds will be obtained due to there being different carboxylic acid reactive groups in the molecule which can attach to the heterocyclic ring. It is also to be noted that for R* groups which are hydroxy-terminated, such as for example lactic acid or citric acid, it is possible for polyester formation to occur via reaction of the lactic acid moiety (or citric acid) with another lactic acid (or citric acid) moiety. In the case of lactic acid polymensation of two lactic acid molecules therefore the R* group would be $CH(CH_3)O(CO)CH(CH_3)OH$. Depending on the reaction conditions therefore, a mixture of dye compounds can be obtained, for example in the case of citric acid, a mixture of one or more of the monocitrate compounds (there could be two different isomers of these depending on which carboxylic acid group attaches to the heterocyclic ring), bis-citrate compounds (including different structural isomers), and compounds formed from a citric acid polymer.

Without wishing to be bound by theory, it is believed that high fixation values for the reactive dye compounds herein derived from hydroxy carboxylic acids such as citric acid is the result of preferential bonding of the reactive dye to nucleophiles on the fibre vis a vis nucleophiles in solution. Additionally, any hydrolysed dye may be reactivated by carboxylic acids present in solution.

Preferred reactive dye compounds of the present invention may be represented by the following formula (I):

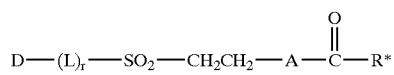

wherein:
D is a chromophore group;
r is 0 or 1;
L is a linking group selected from NH, $(CH_2)_n$, N—$(CH_2)_n$ N, —$(CH_2)_n$—N,

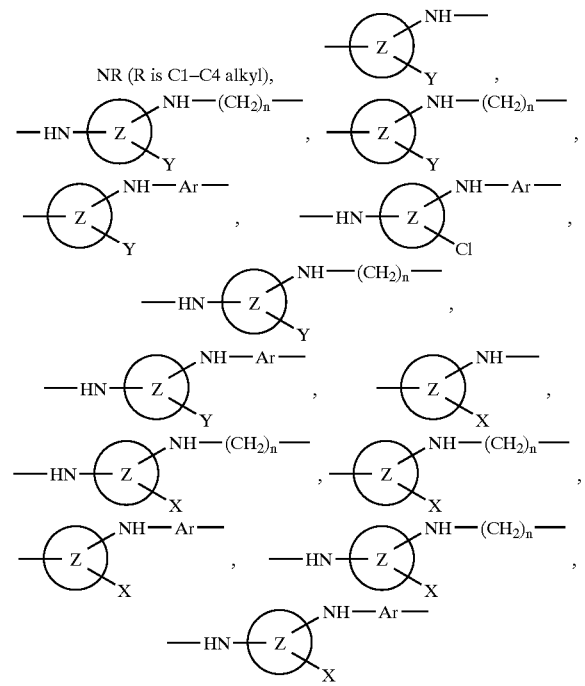

wherein
Ar is an aryl group, preferably benzene, Y is halogen or O(C=O)R*, n is an integer of from 1 to 4, Z is a nitrogen-containing heterocycle, X is selected from thio-derivatives, halogen (preferably fluorine and chlorine), amiines, alkoxy groups, carboxylic acid groups, CN, $N_3$, and quaternized nitrogen derivatives, Q+;
A is O or S,
R* is selected from $(CH_2)_n SH$, $(CH_2)_n NH_2$, $CH(CH_3)OH$, $C(OH)(CH_2COOH)_2$, $CH_2C(OH)(CO_2H)CH_2COOH$, $C(OH)(H)CH2COOH$, $CH2C(H)(OH)COOH$, $C(OH)(H)C(OH)(H)COOH$, derivatives of hydroxy carboxylic acid polymerisation (e.g. in the case of polymerisation of two lactic acid molecules R* is $CH(CH_3)O(CO)CH(CH_3)OH)$, $(CH_2)_n NHR_1$, $CH_2NR_1R_2$, $CH_2NHNH_2$, $CH_2NHOH$, $CH_2SMe$, $CH(NH_2)(CH_2)_n(COOH)$, $CH(NH_2)CH_2SMe$, $CH(NH_2)CH_2SSCH_2CH(NH_2)COOH$, $CH(NH_2)CH_2SO_3H$, $C_6H_4OH$, $C_6H_4COOH$, $C_6H_4NH_2$, $C_5H_4N$, $(CH_2)_n C_5H_4N$, $CH(R\#)NH_2$, $(CH_2)_n$—$SSO_3^-$, $(CH_2)n$—S—S—$(CH_2)_n$, peptide or polypeptide, wherein $R_1$ and $R_2$ is independently selected from $C_1$–$C_4$ alkyl, wherein n is an integer in the range of 1 to 4 wherein within the same molecule n is not necessarily the same integer and where R# corresponds to an amino acid sidechain.

Nitroyen-containing Heterocycle (Z)

Suitable nitrogen containing heterocycles for use herein include monocyclic, bicyclic or polycyclic, unsaturated heterocycles containing at least one nitrogen heteroatom. When monocyclic rings are used, they are preferably selected from unsaturated rings having from about 3 to about 7 ring atoms, especially 5 or 6 ring atoms, comprising from about 1 to about 3 nitrogen beteroatoms, prefaably 2 or 3 nitrogen heteroatonms When bicyclic heterocycles are used, they preferably comprise an unsated nitrogen containing heterocycle having 3 to 7 ring atoms, preferably an unsaturated nitrogen containing heterocycle having 5 or 6 ring atoms comprising 1 or 2 nitrogen atoms, fuse to a 5 to 7 membered carbocycle preferably a 6-membered unsaturated carbocycle. When bicyclic heterocycles are used, the oxy carbonyl substituents are preferably attached to the nitrogen containing heterocyclic ring.

Preferred for use herein are 5 or 6 membered unsaturated nitrogen containing monocyclic heterocyclic rings comprising 2 or 3 nitrogen heteroatoms or bicyclic rings containing a 5 or 6 membered unsaturated heterocyclic ring containing 2 nitrogen heteroatom fused to a 6 membered unsaturated carbocycle.

Examples of suitable heterocycles for use herein include, but are not necessarily limited to triazine, pyrimidine, quinoxaline, pyrimidinone, phthalazine, pyridazone and pyrazine.

Preferred for use in the compounds herein are triazine, pyrimidine and quinoxaline.

Suitable thio-derivatives for use herein include, but are not necessarily limited to groups baving the formula SR' wherein R' is selected from H or alkyl or preferably short chain alkyl (preferably less than about 6 carbon atoms), alkanol, alkyl carboxylate, alkylamide, alkylsulphonate, alkyl phosphonate, alkyl thiosulphonate, alkylamine, alkyl thiosulphate, aryl sulpbonate, aryl carboxylate, aryl phosphate, aryl amine, cyanates, sulphonates, branched alkyl thio carboxylates, branched alkanol thiols, guanides, alkyl-α-(amino-α-carboxylate, (di) thio alkyl esters of glycerol, alkyl thiol alkyi esters of glycerol, alkyl esters, mono thio diesters, thiol alkyl esters of ethylene glycol, alkyl thioi alkyl ester of ethylene glycol and alkyl thiolipoates. Preferably R' is selected from alkyl carboxylates, alkanols and alkylamines.

Examples of suitable thio-derivatives include SR' groups where R' is selected from $C_1$–$C_4$ alkyl, $(CH_2)_n COOH$, $(CH_2)_n CONH_2$, $(CH_2)_n SO_3H$, $(CH_2)_n COOM$, $(CH_2)_n PO_3H$, $(CH_2)_n OH$, $(CH_2)_n SSO_3^-$, $(CH_2)_n NR''_2$, $(CH_2)_n N^+R''_3$, $PhSSO_3^-$, $PhSO_3H$, $PhPO_3H$, $PhNR''_2$, $PhN^+R''_3$, —CN, $SO_3^-$, $(CH_2)_2CH(SH)R''(CH_2)_3COOH$, —$CH_2CHOHCH_2SH$, and

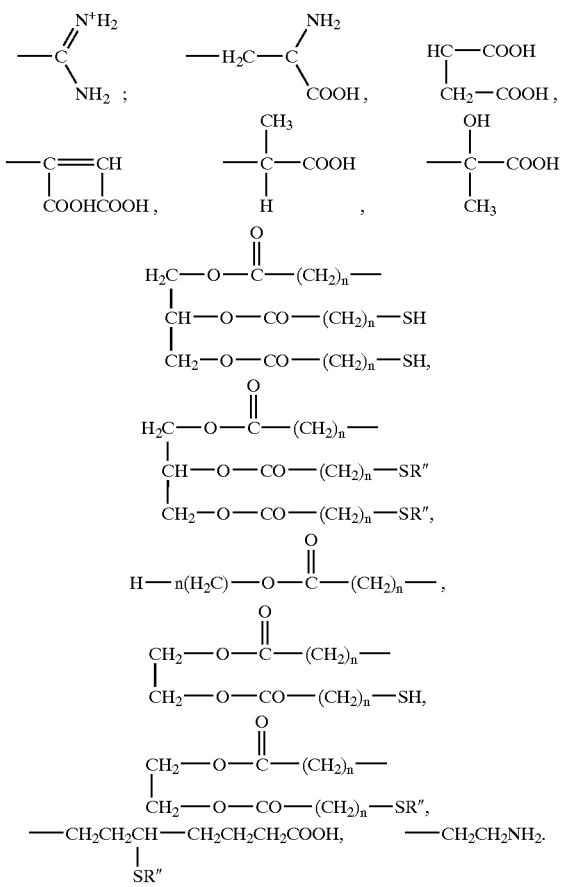

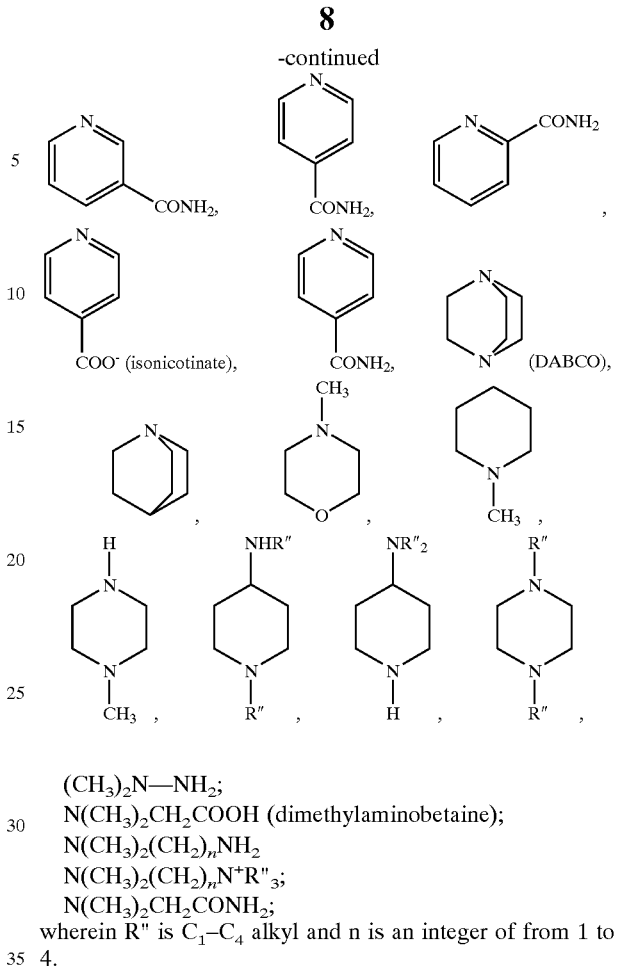

n is an integer in the range of 1 to 4 wherein within the same molecule n is not fnecessarily the same integer, and M is a cation of alkaline ear metal, alkali metal, $NH_4^+$ or $NR''_3{}^+$ and wherein R" is $C_1$–$C_4$ alkyl.

Preferred thiodenvatives for use herein have the formula SR' wherein R' is $(CH_2)_n COOH$, $(CH_2)_n OH$, and $(COOH)CH_2CH_2(COOH)$, wherein n is an integer from 1 to 4.

Especially preferred for use herein are thioglycolate (R'=$CH_2COOH$) thioethanol (R'=$(CH_2)_2OH$) and thiosuccinate (R'=$(COOH)CH_2CH_2(COOH)$), especially thioglycolate.

Suitable quaternized nitrogen derivatives for use herein can be represented by Q+ wherein Q is selected from amines, :saturated or unsaturated, substituted or unsubstituted nitrogen containing heterocycles having from about 3 to about 8 ring members and comprising at least one nitrogen heteroatom. Preferred substituents are carboxylates, amides, $C_1$–$C_4$ alkyl and alkyl carboxylates.

Particularly preferred for use herein are Q groups selected from:

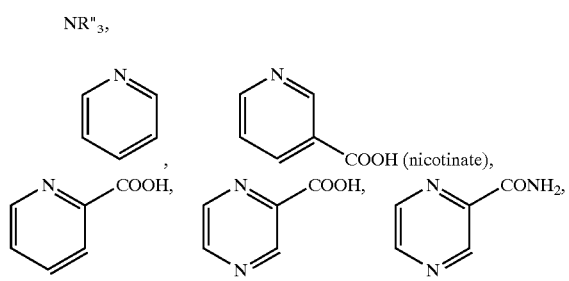

$(CH_3)_2N—NH_2$;
$N(CH_3)_2CH_2COOH$ (dimethylaminobetaine);
$N(CH_3)_2(CH_2)_nNH_2$
$N(CH_3)_2(CH_2)_nN^+R''_3$;
$N(CH_3)_2CH_2CONH_2$;
wherein R" is $C_1$–$C_4$ alkyl and n is an integer of from 1 to 4.

Particularly preferred quaternized nitrogen derivatives for use herein are nicotinate, diazabicyclooctane (DABCO), dimethylaminobetaine and isonicotinate, especially nicotinate.

The quaternized nitrogen derivative is attached to the nitrogen-containing heterocycle via its tertiary nitrogen atom.

Preferred X groups include Y, SR", halogen (preferably F or Cl), NR"H, NR"2, OR", COOH, SCN, SSO3, SO3, NH1R2, CN, N3 and quaternized nitrogen derivatives Q+, wherein R" is C1–C8 alkyl, or aryl and wherein Q, R1 and R2 are as defined above.

Particularly preferred X groups for use herein are Y, halogen (fluorine and chlorine) and quaternized nitrogen derivatives.

A particularly preferred reactive dye compound of the present invention wherein the O(C=O)R* group in formula (I) above is derived from citric acid has the following structure (Ia):

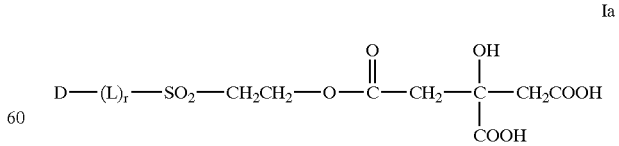

wherein D, L, r are as defined above.

Another preferred reactive dye compound of the present invention wherein the O(C=O)R* group in formula (I) above is derived from citric acid has the following structure (Ib). This compound below (Ib) and the compound above (Ia) differ due to a different —COOH group of the citric acid attaching to the —SO$_2$—CH$_2$CH$_2$— group.

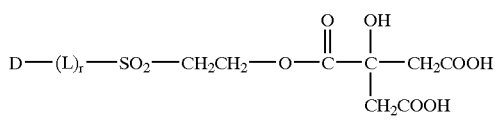

wherein D, L and r are as defined above.

Other dye compounds according to the present invention may be represented by the formula (II):

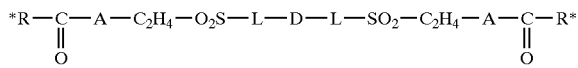

wherein:
D, L, A and R* are the same or different and are as defined above in relation to formula (I).

Yet other dye compounds according to the present invention may be represented by the formula (III):

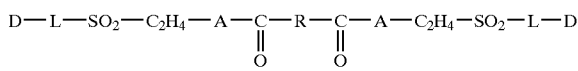

wherein:
D, L, A are the same or different and are as defined above in relation to formula (I) and R is derived from R* as defined above, for example carboxylic acids having more than one carboxylic acid groups.

Other dye compounds according to the present invention may be represented by the formula (IV):

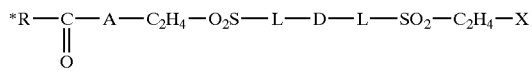

wherein:
D, L, A and R* are as defined above in relationito formula (I) and wherein X is selected from thioderivafives, halogen (preferably fluorine and chlorine), amines, alkoxy groups, carboxylic acid groups, CN, N$_3$, and quatemized nitrogen derivatives, Q+.

The present invention fiurthermore relates to processes for the preparation of dyes herein. In general, dyes herein are prepared by a process which comprises the steps of reacting a first starting material (preferably one mole) with a second starting material (preferably one mole), the first starting material comprising at least one chromophore, at least one SO$_2$C$_2$H$_4$ group which is attached to the chromophore group either directly via the sulphur atom of the SO$_2$C$_2$H$_4$ group or via a linking group (for example a Remazol dye), the second starting material comprising an oxy- or thio-carbonyl group (for example citric acid). It is preferable that the reaction is carried out at a pH of between 2 to 8, preferably 3 to 5 and over several hours, preferably 1 to 5 hours, more preferably 2–3 hours.

Compounds herein having the formula (I) are prepared by reacting a first starting material (preferably one mole) with a second starting material (preferably one mole), the first starting material containing a D—(L)$_r$—SO$_2$—CH$_2$CH$_2$— group as defined above (for example a Remazol dye, such as Remazol Brill Blue RS commercially available from Dystar), the second starting material containing an A(C=O)R* group (for example citric acid (polymerized or unpolymerized), lactic acid (polymerized or unpolymerized), salicylic acid, tartaric acid, malic acid, nicotinic acid, isonicotinic acid, etc). It is preferable that the reaction is carried out over several hours (2–5 hours). In the case of hydroxyacids such as citirc acid, lactic acid, tartaric acid, and the like, it is particularly important to add the acid dropwise over several hours, preferably from about 1 to about 5 hours, preferably from about 1 to about 3 hours.

In order to ensure that the second starting material containing the A(C=O)R* group bonds to the vinyl sulphone group via the oxy-carbonyl or thio-carbonyl group it is preferable to carry out the reaction under acidic conditions, preferably at a pH of from about 1 to about 8, preferably from about 2 to about 8, more preferably from about 3 to about 5.

In general, dyes having the formula (II)–(IV) can be prepared by using the same general chemistry as for dyes of formula (I) by reacting together suitable starting materials, in suitable amounts.

Depending upon the reaction conditions (for example, amounts of each starting material, form of each starting material e.g. in the case of hydroxyacids polymerized/unpolymerized), mixtures of different dye compounds may be obtained in the final product, such mixtures containing for example, products formed from further substitution reactions, structural isomers (e.g. in the case of citric acid which an unsymmetrical molecule having two carboxylic acid groups), products formed from polymerisation of hydroxy acids (e.g. citric acid and lactic acid. In the case of dipolymerized lactic acid for example the R* group will be CH(CH$_3$)O(CO)CH(CH$_3$)OH).

Hence according to another aspect of the present invention there is provided the product obtainable by any of the processes detailed herein.

In particular, there is provided a product obtainable by a process wherein the process comprises the steps of reacting a first starting material (preferably one mole) with a second starting material (preferably one mole), the first starting material comprising at least one chromophore, at least one SO$_2$C$_2$H$_4$ which is attached to the chromophore group either directly via the sulphur atom of the SO$_2$C$_2$H$_4$ group or via a linking group (for example a Remazol dye), the second starting material comprising an oxy- or thio-carbonyl group (for example citric acid). It is preferable that the reaction is carried out at a pH of between 2 to 8, preferably 3 to 5 and over several hours, preferably 1 to 5 hours, more preferably 2—3 hours.

The dye compounds herein are suitable for dyeing and printing a wide variety of substrates, such as silk, leather, wool, polyamide fibers and polyurethanes, keratin fibres such as hair, and in particular cellulosic materials, such as the natural cellulose fibres, cotton, linen, hemp and the like, paper, and also cellulose itself and regenerated cellulose, and hydroxyl-containing fibres contained in blend fabrics, for example blends of cotton with polyester or polyamide fibres.

The dye compounds of the present invention can be applied and fixed to the substrate in various ways, in particular in the form of a solid mixture, aqueous dye solutions and printing pastes. Thus according to the present invention there is provided a dye composition comprising one or more of the dye compounds described herein together with any carrier material suitable for use in a dye composition.

Preferred dye compositions herein comprise an acidic buffer material. Any acidic buffer suitable for use in dye compositions can be used herein. An example of a suitable buffer is a mixed phosphate buffer.

When the dye composition herein is in the form of a paste a preferred ingredient is a thickening agent. Any suitable thickening agents suitable for use in reactive dye compositions can be used herein.

When the dye composition is in the form of an aqueous solution or aqueous gel/paste, the dye composition preferably has a pH of from about 2 to about 8, more preferably from 2 to 5, especially from 2 to 3.

The dyeing and printing processes which can be used with the dyes herein are conventional processes which are well known and which have been widely described in the technical and patent literature. The dye compounds herein are suitable for dyeing both by the exhaust method (long liquor) and also by the pad-dyeing method, whereby the goods are impregnated with aqueous, salt-containing or salt-free dye solutions and the dye is fixed after an alkali treatment or in the presence of alkali, if appropriate with the application of heat. The dye compounds herein are also suitable for the cold pad-batch method, after which the dye together with the alkali is applied using a pad-mangle, the fabric hatched on a roll. A dye-fibre covalent reaction occurs over several hours of storage at room temperature. Alternatively, padded or printed goods may be fixed by a steaming process using steam temperatures between 100–130° C. After fixing, the dyeings or prints are thoroughly rinsed with cold and hot water, if appropriate with the addition of an agent acting as a dispersant and promoting the diffusion of the non-fixed portions.

Thus in accordance with another aspect of the present invention there is provided a use of the reactive dyes of the present invention for dyeing and printing substrates such as cotton, wool, nylon, silk, keratin, hair, leather, paper and the like. The compounds herein can be used in methods of dyeing all of the substrates listed above by applying an aqueous solution of one or more of the reactive dyes of the present invention to the substrate to be dyed under suitable conditions of pH and temperature.

The following examples serve to illustrate the compounds and compositions of the present invention.

The starting compounds and components given in the examples below can be used in the form of the free acid or in the form of their salts. As discussed above, the products obtained in the examples below may comprise mixtures of different dye compounds. In the Examples below all the starting materials are commercially available. In particular the Remazol dyes are available from Dystar Textilfarben, GmbH & Co., Deutschland KG, BU -R/F & E, Werk Hochst, Building G834, D-65926 Frankfurt am Main, Germany, and the Sumifix dyes are available from Sumitomo Chemical Co. Lt, Mar. 3, 1998, Kasugade-naka, Konohana-ku, Osaka 554, Japan.

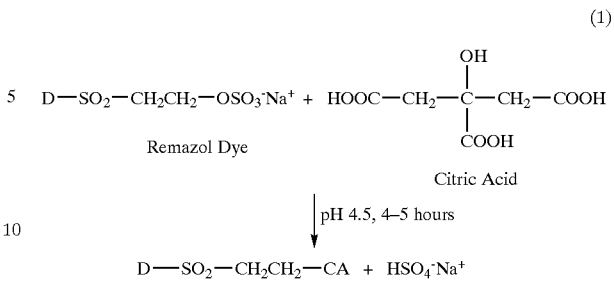

In the reaction mechanism above CA denotes the —O(C=O)R* group in formula (I) above derived from citric acid, i.e —C(OH)(CH$_2$COOH)$_2$ or —CH$_2$C(OH)(COOH)CH$_2$COOH. It should be noted that the citric acid moiety is bonded to the heterocycle via one of its carboxylic groups. It will be understood by those skilled in the art that in the case of unsymmetrical compounds having more than one carboxylic acid group, for example, citric acid and malic acid, that a mixture of dye compounds can be obtained due to there being different carboxylic acid reactive groups in the molecule which can attach to the vinyl sulphone group. However it is believed that in the case of citric acid that the citric acid reacts primarily via its carboxylic acid group to give a compound wherein the R* group is C(OH)(CH$_2$COOH)$_2$.

0.005 moles of pure Remazol Brill Blue RS dye is dissolved in 150 ml of distilled water in a 400 ml flask. The temperature of the reaction system is adjusted and maintained between 20° C. The pH of the dye solution is adjusted to 5–5.5 using solid sodium carbonate. 0.005 moles of citric acid is dissolved in 50 ml of distilled water. The pH of this solution is adjusted to around 4.5. The citric acid solution is added slowly to the solution of dye. The rate of addition is such that the addition takes around 2 hours to complete. During the process of addition, the temperature of the reaction system is maintained at 20° C. After completion of the addition of citric acid, the reaction is allowed to continue for 4–5 hours. The end-of-reaction point is indicated by the pH of the reaction system remaining constant for more than 5 minutes. At this point dye compound (I) is obtained. Using 6N HCl, the pH of the system is then reduced to below pH2.5 to terminate the reaction. KSCN (25% of the total solution) is then added to the reaction mixture in order to precipitate the dye. Filtration using Whatman filter paper follows. The precipitate is then washed with acetone for 5–6 times (50 ml of acetone is used each time) to obtain the final dye product (in fine powder form of deep blue colour).

Example 2 (RBBRS/TA Dye)

The compound denoted (2) is prepared according to the reaction scheme of Diagram 2.

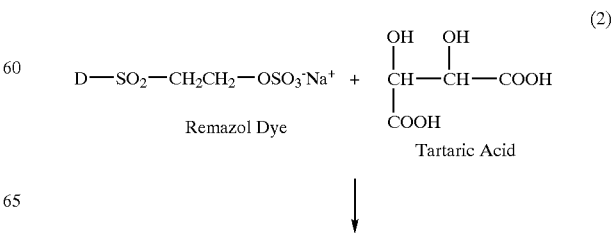

EXAMPLES

Example 1 (RBBRS/CA Dye)

The compound denoted by (1) below was prepared according to the reaction scheme in Diagram 1.

-continued

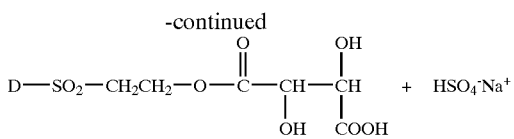

0.005 moles of pure Remazol Brill Blue RS Dye is dissolved in 150 ml of distilled water in a 400 ml flask. The temperature of the reaction system is adjusted and maintained at 20° C. The pH of the dye solution is adjusted to about 4.5 using solid sodium carbonate. 0.005 moles of tartaric acid is dissolved in 50 ml of distilled water. The pH of this tartaric acid solution is adjusted to around 4.5. The tartaric acid solution is slowly added into the solution of dye. The rate of addition is such that addition takes around 2 hours to complete. During the process of addition, the temperature of the reaction system is maintained at 20° C. After completion of the addition of tartaric acid, the reaction is allowed to continue for 4–5 hours. The end-of-reaction point is indicated by the pH of the reaction system remaining constant for more than 5 minutes. At this point, the dye compound (2) is obtained. Using 6N HCl, the pH of the system is then reduced to below pH 2.5 to terminate the reaction. KSCN (25% of the total solution) is then added to the reaction mixture in order to precipitate the dye. Filtration using Whatman filter paper follows. The precipitate is then washed with acetone for 5–6 times (50 ml acetone used each time) to obtain the final dye product (in fine powder form of deep blue colour).

Example 3 (RBBRS/LA Dye)

A compound denoted by (3) is prepared according to the reaction scheme in Diagram 3.

0.005 moles of pure Remazol Brill Blue R Special dye is dissolved in 150 ml of distilled water in a 400 ml flask. The temperature of the reaction system is adjusted and maintained at around 20° C. The pH of the dye solution is adjusted to 5–5.5 using solid sodium carbonate. 0.005 moles of lactic acid is dissolved in 50 ml of distilled water. The pH of the lactic acid solution is adjusted to around 4.5. The lactic acid solution is slowly added into the solution of dye. The rate of addition is such that the addition takes around 2 hours to complete. During the process of addition, the temperature of the reaction system is maintained between 20° C. After completion of addition of lactic acid, the reaction is allowed to continue for 3–4 hours. The end-of-reaction point is indicated by the pH of the reaction system remaining constant for more than 5 minutes. At this point, the dye (2) is obtained. Using 6N HCl, the pH of the system is then reduced to below around pH 2.5 to terminate the reaction. KSCN (25% of the total solution) is then added to the reaction mixture in order to precipitate the dye. Filtration using Whatman filter paper follows. The precipitate is then washed with acetone for 5–6 times (50 ml of acetone each time) to obtain the final dye product (in fine powder form of deep blue colour).

Example 4

The dye Sumifix Supra Brill Red 2BF has the following structure:

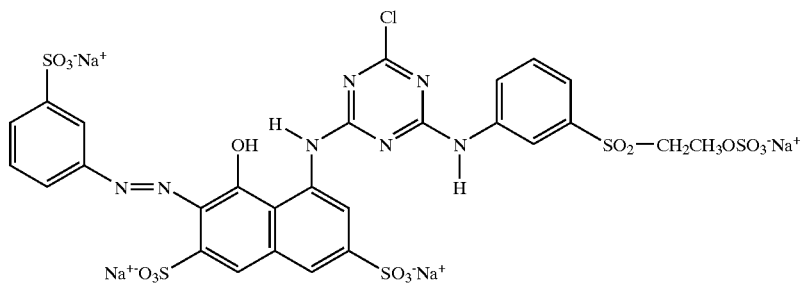

This dye can be represented as:

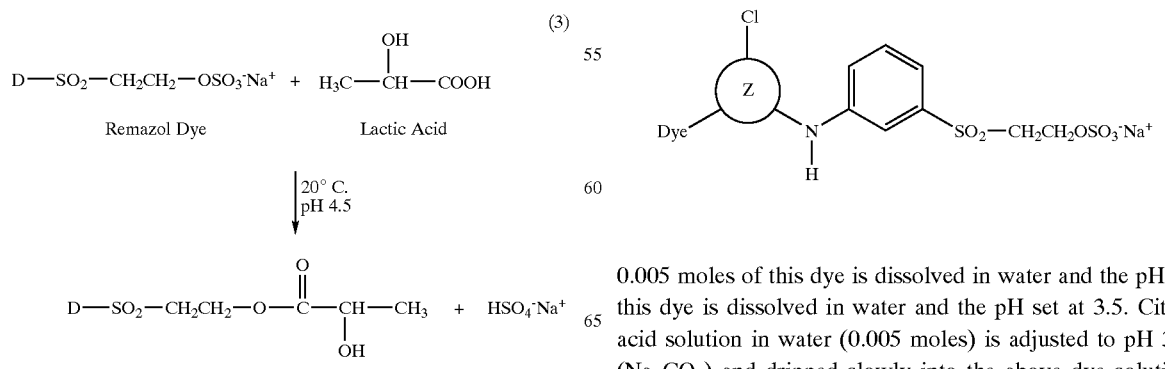

0.005 moles of this dye is dissolved in water and the pH of this dye is dissolved in water and the pH set at 3.5. Citric acid solution in water (0.005 moles) is adjusted to pH 3.5 (Na$_2$CO$_3$) and dripped slowly into the above dye solution over 4 hours (30 C.). The product contains the following new dye:

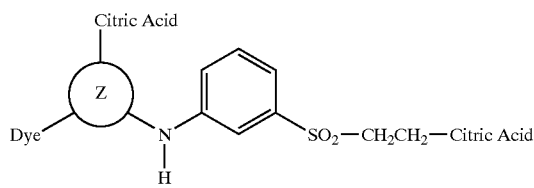

In the reaction mechanism above Citric Acid denotes the —O(C=O)R* group in formula (I) above derived from citric acid, i.e. —C(OH)(CH$_2$COOH)$_2$ or —CH$_2$C(OH)(COOH)CH$_2$COOH. It should be noted that the citric acid moiety is bonded to the heterocycle via one of its carboxylic groups. It will be understood by those skilled in the art that in the case of unsymmetrical compounds having more than one carboxylic acid group, for example, citric acid and malic acid, that a mixture of dye compounds can be obtained due to there being different carboxylic acid reactive groups in the molecule which can attach to the vinyl sulphone group. However it is believed that in the case of citric acid that the citric acid reacts primarily via its carboxylic acid group to give a compound wherein the R* group is C(OH)(CH$_2$COOH)$_2$.

Example 5

The dye Remazol Brilliant Orange 3RS has the following structure:

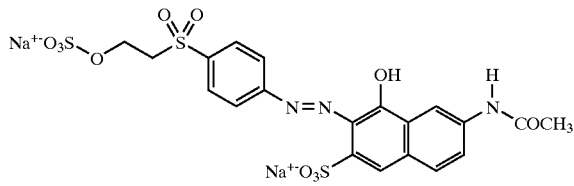

This dye can be represented as:

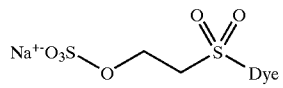

This dye can be activated to its vinyl sulphone analogue by beating at pH10. Thus 0.005 moles of the SES dye is heated for 20 minutes at 60 C. at pH10(sodium carbonate). The pH is maintained as necessary at pH10. Capillary electrophoresis is used to follow the reaction:

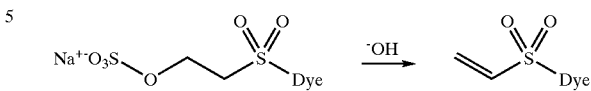

This vinyl sulphone dye solution is adjusted to pH3.5 and added slowly at 35 C. to a stiffed solution of citric acid (0.010 moles). After 4 hours CE analysis shows that the reaction is complete.

The final dye product was also characterised by infra-red, which showed the presence of two new ester carbonyl stretching frequencies at 1755 cm$^{-1}$ and 1744 cm$^{-1}$, both of which are absent from the sulfatoethyl sulfone form and the vinyl sulfone form.

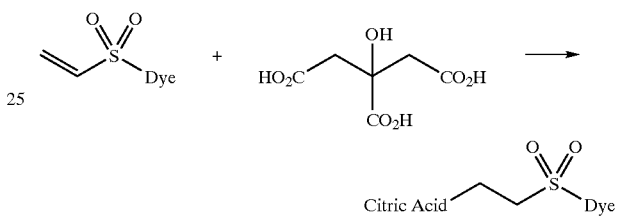

In the reaction mechanism above Citric Acid denotes the —O(C=O)R* group in formula (I) above derived from citric acid, i.e. —C(OH)(CH$_2$COOH)$_2$ or —CH$_2$C(OH)(COOH)CH$_2$COOH. It should be noted that the citric acid moiety is bonded to the heterocycle via one of its carboxylic groups. It will be understood by those skilled in the art that in the case of unsymmetrical compounds having more than one carboxylic acid group, for example, citric acid and malic acid, that a mixture of dye compounds can be obtained due to there being different carboxylic acid reactive groups in the molecule which can attach to the vinyl sulphone group. However it is believed that in the case of citric acid that the citric acid reacts primarily via its carboxylic acid group to give a compound wherein the R* group is C(OH)(CH$_2$COOH)$_2$.

Example 6

Remazol Black B dye has the following structure:

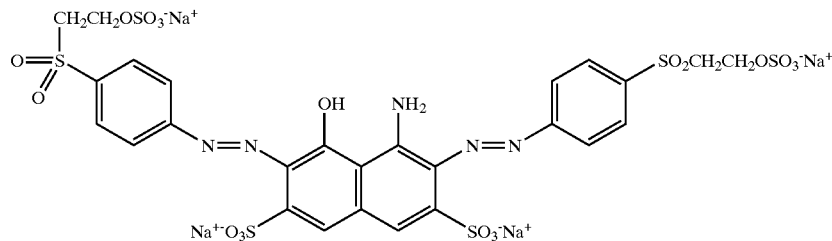

0.005 moles of this dye is heated in a bath at 60° C. at pH10–10.5 for 20 minutes. CE analysis shows complete conversion to the bis-vinylsulphone form. The bis-vinylsulphone dye is added to a stirred solution of lactic acid (0.005 moles) at pH 3.5 at 40° C. This addition is complete in about 1 hour and the mixture if left stirring for a further 3 hours. The final product contains the compound:

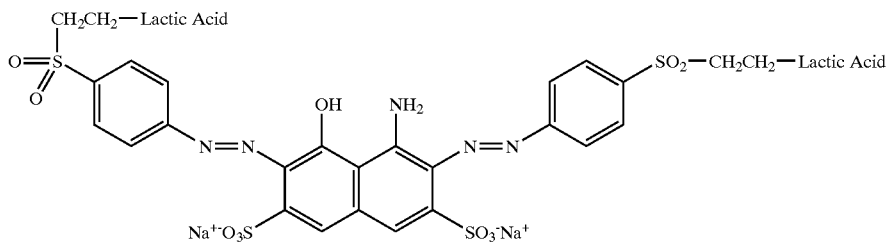

In the reaction mechanism above Lactic Acid denotes the —O(C=O)R* group in formula (I) above derived from lactic acid.

Example 7

Dye I (sulphatoethylsulphone dye) has the structure below

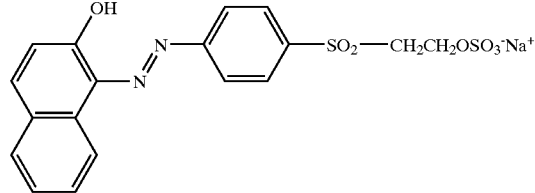

Dye I

Synthesis of Dye I is carried out as follows. p-aminobenzene-β-sulphatoethylsulphone (PABSES) (0.018M, 5.06 g) is stirred in water (300 ml) and acidified to pH 1.3 by the addition of 35% HCl (2.4 ml). The solution is cooled to 0–5° C. and 0.5M aqueous sodium nitrite (37 ml) is gradually added over 20 minutes. After stirring for a further 10 minutes, any excess nitrous acid remaining is destroyed by the addition of 10% w/w aqueous sulphamic acid to yield the diazo component. The diazo component is added to a solution of β-naphthol (0.018M, 2.59 g) in 0.2M aqueous sodium hydroxide (50 ml) at 0–5° C. The pH of the solution is adjusted to 7.0 via the addition of 0.1M aqueous HCl and stirred at 0–5° C. for 1 hour. After 1 hour, the temperature of the solution is allowed to reach ambient and potassium thiocyanate (50 g) is added. The mixture is stirred for a further 30 minutes, after which time the precipitated dye is collected by filtration, washed thoroughly with acetone to remove KSCN and dried in a dessicator.

Dye II (Citrate Dye)

Dye II is prepared as follows:

Citric acid (0.004M, 0.8 g) is dissolved in water (50 ml), adjusted to pH 3–3.5 via the addition of solid sodium carbonate and then gradually added dropwise, 1 drop per 15 sec, to a solution of Dye I (0.004M, 2.0 g) in water (150 ml) at 40° C. The pH of the dye solution is maintained between 3.5–4.0 during the addition of the aqueous citric acid via the addition of solid sodium carbonate, the pH of the dye solution being maintained after the addition of the acid until an increase in pH is detected. At this point the dye solution is acidified with concentrated HCl to pH 2 and cooled to room temperature. The dye (Dye II) precipitates from solution and is collected by filtration, washed thoroughly with acetone and finally dried in a vacuum dessicator. The dye is stored in a fridge at 0–5° C.

Dye II has the following structure:

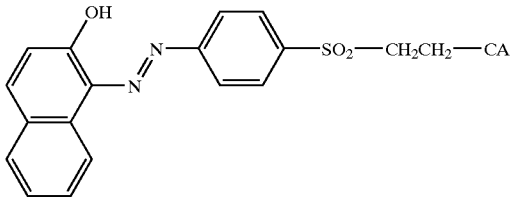

Dye II

In the reaction mechanism above CA denotes the —O(C=O)R* group in formula (I) above derived from citric acid, i.e. —C(OH)(CH$_2$COOH)$_2$ or —CH$_2$C(OH)(COOH)CH$_2$COOH. It should be noted that the citric acid moiety is bonded to the heterocycle via one of its carboxylic groups. It will be understood by those skilled in the art that in the case of unsymmetrical compounds having more than one carboxylic acid group, for example, citric acid and malic acid, that a mixture of dye compounds can be obtained due to there being different carboxylic acid reactive groups in the molecule which can attach to the vinyl sulphone group. However it is believed that in the case of citric acid that the citric acid reacts primarily via its carboxylic acid group to give a compound wherein the R* group is C(OH)(CH$_2$COOH)$_2$.

The FT-IR spectra of Dye I and Dye II can be obtained on a Perkin-Elmer 1740 FT-IR spectrophotometer, the spectra obtained using the KBr disc technique which is well known to those skilled in the art. The spectra obtained are presented in FIGS. I and II, whilst some of the more significant peaks present in the spectra arc listed in Table I below.

TABLE I

| Characteristic absorption peaks present in the FT-IR spectra of Dye I and Dye II | | |
|---|---|---|
| Dye | Wavenumber cm$^{-1}$ | Functional group |
| Dye I | 1005 | —SO$_3^-$ |
| | 1051 | —OSO$_3^-$ |
| | 1067 | —SO$_3$ |
| | 1135 | —SO$_2$— |
| | 1234 | —OSO$_3^-$ |
| | 3456 | —OH |

TABLE I-continued

Characteristic absorption peaks present
in the FT-IR spectra of Dye I and Dye II

| Dye | Wavenumber cm$^{-1}$ | Functional group |
|---|---|---|
| Dye II | 980 | —CH=CH$_2$ |
| | 1136 | —SO$_2$— |
| | 1384 | —CH=CH$_2$ |
| | 1725 | —CO—(ester) |
| | 3436 | —OH |

The compounds prepared according to Examples 1 to 7 and at standard depths all have high Exhaustion Values, high Fixation Values, particularly on cellulosic substrates such as cotton, and show significant improvements in terms of reducing spent dyestuff in effluent, increasing dye affinity to the substrate, increasing the dye-substrate covalent bonding, increasing the ability to dye substrates at room temperature, decreasing the amount of dye that is removed during the post dyeing "soaping off process" and therefore simplifying the post dyeing "soaping off process" traditionally associated with dyeing cotton with fibre reactive dyes and reduction of staining of adjacent white fabrics. In addition, the compounds prepared above provide more intense dyeings and require less levels of salt for dyeing cotton substrates. These advantages can be demonstrated by the following Examples 8 and 9.

Example 8

All dye compounds prepared according to Examples 1 to 7 can be used to dye cotton using the dyeing procedures detailed below. After the cotton dyeing procedure has been carried out a soaping-off process can also be carried out on the cotton fibre.

Cotton Dyeing Procedure

An aqueous dye solution is prepared containing a dye compound according to any of Examples 1 to 7. The dye solution contains 1% on mass of fibre of dye, 80 g/L Na$_2$SO$_4$ and 5% on mass of fibre of sodium acetate. The cotton fabrics are soaked in water and then the cotton fabrics are dyed in the above dye-bath at pH 7 at 50° C. for 45 minutes. The dyed cotton fabric is then fixed in the dye-bath at pH 11.5 with addition of 30 g/L of trisodium phosphate and dyeing continued at 50° C. for 60 minutes. The dyed fabric is rinsed with water.

In the above dyeing procedure the dye bath for each dye compound is almost totally exhausted (i.e. only slight colour in the dye bath after dyeing), indicating that the compounds prepared according to Examples 1 to 7 each have a high Exhaustion Value (>95%). The Exhaustion Values for each product can be obtained by comparing the photo-absorption of the dyebath liquid before and after dyeing. The Exhaustion Values for Examples 1 to 3 are given in Table A below.

Soaping-off Process

A soaping off process can then be carried out by washing the dyed fabrics with an aqueous solution of Sandozine NIE (2 g/L) (available from Clariant (Switzerland) Ltd., R&D Dyestuffs, Post Box, Building 88/1007, CH-4002 Basel) at 100° C. for 30 minutes.

In the above soaping-off process hardly any colour was removed from the fabric, resulting in an almost colourless soaping liquid, indicating that the compounds prepared according to Examples 1 to 7 each have a high degree of dye-fibre covalent bonding and a high Fixation Value (>95%). The Fixation Values of the dye products prepared according to Examples 1 to 3 are shown in Table A below.

TABLE A

Exhaustion and Fixation Values for Example 1 to 3

| Eg. | Dye Name | Colour of Powder Dye Product | Exhaustion Value (E %) | Fixation Value (F %) | Efficiency Value (T) |
|---|---|---|---|---|---|
| 1 | RBBRS/CA | Deep Blue | 99.71% | 97.36% | 97.08 |
| 2 | RBBRS/TA | Deep Blue | 99.14% | 95.44% | 94.62 |
| 3 | RBBRS/LA | Deep Blue | 98.35% | 96.93% | 98.58 |

The E, F and T values of the dyes according to the present invention are typically higher than many of the commercially available starting materials. In particular, the F and T values of the dyes according to the present invention are significantly higher than those of the commercially available starting materials.

Co3 (International Standards Organisation) Wash Fastness Test

The dyed fabrics are washed with an aqueous solution containing ECE Reference Detergent (5 g/ml) and sodium carbonate (2 g/ml) at 60° C. for 30 minutes.

In the above wash fastness test, no noticeable colour was removed from the cotton fibre and no staining of the white adjacent fibres occurred (using Multiple Fibre adjacent strip supplied by the Society of Dyes and Colourists, Bradford, UK).

Example 9

All dye compounds prepared according to Examples 1 to 7 can be used to dye nylon or wool using the dyeing procedures detailed below. After the nylon/wool dyeing procedure has been carried out a wash-test procedure can be carried out on the dyed fabric to test the wash-fastness of the dye compounds.

Wool/Nylon Dyeing Procedure

The wool/nylon fabric is soaked in a 2% w/w Alcopol-O (40% w/w sodium-d-isooctylsulpho-succinate commercially available from Allied Colloids) solution. The fabric is then dyed for 1 hour at 100° C. and pH 3.5 in a dye-bath containing the following compositions 1.2% on mass of fibre of dye prepared according to any of Examples 1 to 7, 5% on mass of fibre of sodium acetate, 1% Albegal B (commercially available from Ciba). The dyed wool/nylon fabric was then rinsed with water.

In the above procedure intense dyeings are provided for each of the compounds prepared according to Examples 1 to 7.

Co2 (ISO) Wash Fastness Test Procedure for Wool/Nylon Fabrics

The dyed wool/nylon fabric is washed in an aqueous solution containing 5 g/L of ECE Reference Detergent (commercially available from the Society of Dyers and Colourists, Bradford, UK) at 50° C. for 45 minutes.

In the above wash fastness test, no noticeable colour was removed from the wool fibre and no staining of the white adjacent fibres occurred ((using multiple fibre adjacent strip supplied by SDC bradford).

What is claimed is:

1. A reactive dye compound comprising:
   (a) at least one chromophore moiety
   (b) at least one SO$_2$C$_2$H$_4$ group which is attached to the chromophore moiety either directly via the sulphur atom of the SO$_2$C$_2$H$_4$ group or via a linking group L; wherein at least one SO$_2$C$_2$H$_4$ group is substituted on its terminal carbon atom with at least one Y group wherein Y is —A(CO)R* wherein A is O or S and wherein R* is an organic residue which contains at least one nucleophilic group; or a salt thereof.

2. A reactive dye compound according to claim 1 wherein R* is selected from the group consisting of $(CH_2)_nSH$, $(CH_2)_nNH_2$, $CH(CH_3)OH$, $CH(CH_3)O(CO)CH(CH_3)OH$, derivatives of a polyester of citric acid, $CH(OH)(CH_2COOH)_2$, $CH_2(OH)(CO_2H)CH_2COOH$, $C(OH)(H)CH_2COOH$, $CH_2C(H)(OH)COOH$, $C(OH)(H)C(OH)(H)COOH$, $(CH_2)nNHR_1$, $CH_2NR_1R_2$, $CH_2NHNH_2$, $CH_2NHOH$, $CH_2SMe$, $CHNH_2(CH_2)_n(COOH)$, $CHNH_2CH_2SMe$, $CHNH_2CH_2SSCH_2CHNH_2COOH$, $CHNH_2CH_2SO_3H$, $C_6H_4OH$, $C_6H_4COOH$, $C_6H_4NH_2$, $C_6H_4N$, $(CH_2)_nC_6H_4N$, $CH(R\#)NH_2$, $(CH_2)_n$—$SSO_3^-$, $(CH_2)_n$—S—S—$(CH_2)_n$, peptides or polypeptides, wherein $R_1$ and $R_2$ is independently selected from $C_1$–$C_4$ alkyl, wherein n is an integer in the range of 1 to 4 wherein within the same molecule n is not necessarily the same integer and wherein R# corresponds to an amino acid sidechain.

3. A reactive dye according to claim 2 wherein R* is selected from the group consisting of $(CH_2)_nSH$, $(CH_2)_nNH_2$, $C_6H_4N$, $CH(R\#)NH_2$, $CH(CH_3)OH$, $CH(CH_3)O(CO)CH(CH_3)OH$, $C(OH)(CH_2COOH)_2$, $CH_2C(OH)(COOH)CH_2COOH$, $C(H)(CH_3)OH$, $C(H)(OH)CH_2COOH$, $CH_2C(H)(OH)COOH$, $C(H)(OH)C(H)(OH)COOH$, $C_6H_4OH$ and $C_6H_4NH_2$.

4. A reactive dye compound according to claim 3 wherein R* is $C(OH)(CH_2COOH)_2$ or $CH_2C(OH)(COOH)CH_2COOH$.

5. A reactive dye compound according to claim 1 wherein A is O.

6. A reactive dye compound having the formula (I):

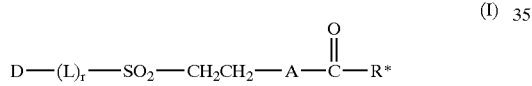

(I)

wherein:

D is a chromophone group;

r is 0 or 1;

L is a linking group selected from the group consisting of NH, $(CH_2)_n$, N—$(CH_2)_nN$, —$(CH_2)_n$—N, NR (R is $C_1$–$C_4$ alkyl),

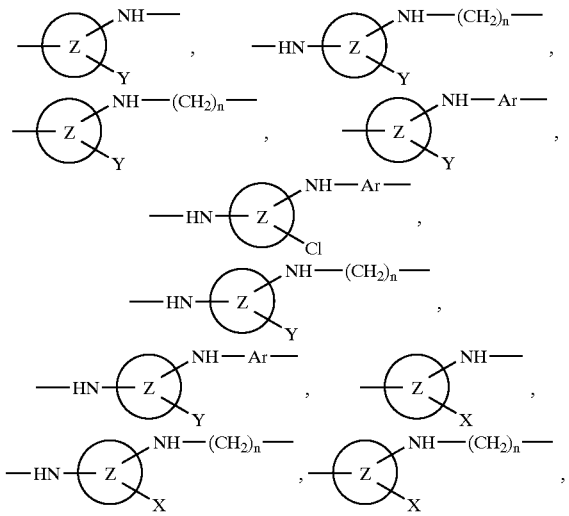

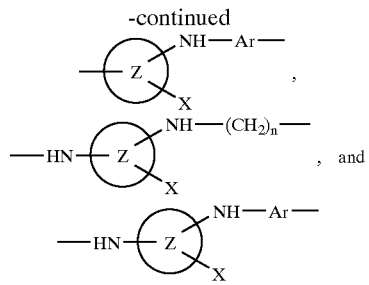

wherein

Ar is an aryl group, Y is halogen or $O(C=O)R^*$, n is an integer of from 1 to 4, Z is a nitrogen-containing heterocycle, X is selected from the group consisting of thio-derivatives, halogens, amines, alkoxy groups, carboxylic acid groups, CN, $N_3$, and quaternized nitrogen derivatives (Q+);

A is O or S,

R* is selected from the group consisting of $(CH_2)_nSH$, $(CH_2)_nNH_2$, $CH(CH_3)OH$, $CH(CH_3)O(CO)CH(CH_3)OH$, derivatives of a polyester of citric acid, $CH(OH)(CH_2COOH)_2$, $CH_2(OH)(CO_2H)CH_2COOH$, $C(OH)(H)CH_2COOH$, $CH_2C(H)(OH)COOH$, $C(OH)(H)C(OH)(H)COOH$, $(CH_2)nNHR_1$, $CH_2NR_1R_2$, $CH_2NHNH_2$, $CH_2NHOH$, $CH_2SMe$, $CHNH_2(CH_2)_n(COOH)$, $CHNH_2CH_2SMe$, $CHNH_2CH_2SSCH_2CHNH_2COOH$, $CHNH_2CH_2SO_3H$, $C_6H_4OH$, $C_6H_4COOH$, $C_6H_4NH_2$, $C_6H_4N$, $(CH_2)_nC_6H_4N$, $CH(R\#)NH_2$, $(CH_2)_n$—$SSO_3^-$, $(CH_2)_n$—S—S—$(CH_2)_n$, peptide or polypeptide wherein $R_1$ and $R_2$ is independently selected from $C_1$–$C_4$ alkyl, wherein n is an integer in the range of 1 to 4 wherein within the same molecule n is not necessarily the integer and wherein R# corresponds to an amino acid sidechain; or a salt thereof.

7. A reactive dye according to claim 6 wherein R* is selected from the group consisting of $(CH_2)_nSH$, $(CH_2)_nNH_2$, $C_6H_4N$, $CH(R\#)NH_2$, $CH(CH_3)OH$, $CH(CH_3)O(CO)CH(CH_3)OH$, $C(OH)(CH_2COOH)_2$, $CH_2C(OH)(COOH)CH_2COOH$, $C(H)(CH_3)OH$, $C(H)(OH)CH_2COOH$, $CH_2C(H)(OH)COOH$, $C(H)(OH)C(H)(OH)COOH$, $C_6H_4OH$ and $C_6H_4NH_2$.

8. A reactive dye according to claim 6 wherein R* is selected from the group consisting of $C(OH)(CH_2COOH)_2$, $CH_2C(OH)(COOH)CH_2COOH$ and derivatives of a polyester of citric acid.

9. A reactive dye compound according to claim 6 wherein A is O.

10. A reactive dye compound having the structure:

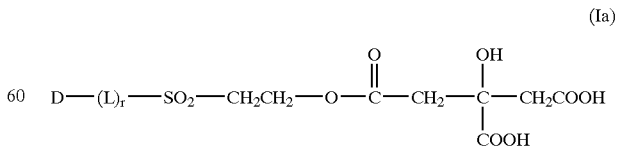

(Ia)

wherein

D is a chromophone group;

r is 0 or 1;

L is a linking group selected from the group consisting of NH, $(CH_2)_n$, N—$(CH_2)_n$N, —$(CH_2)_n$—N, NR (R is C1–C4 alkyl),

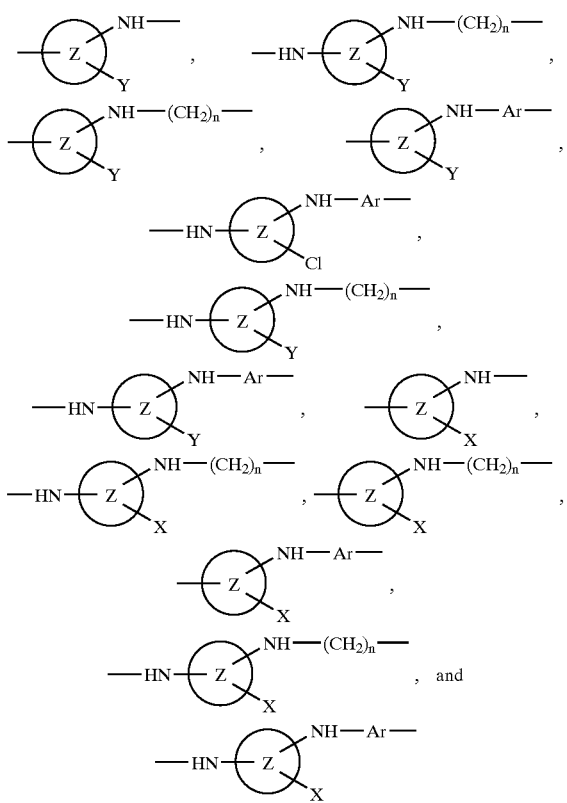

wherein

Ar is an aryl group, Y is halogen or O(C=O)R*, n is an integer of from 1 to 4, Z is a nitrogen-containing heterocycle, X is selected from the group consisting of thio-derivatives, halogens, amines, alkoxy groups, carboxylic acid groups, CN, $N_3$, and quaternized nitrogen derivatives (Q+);

A is O or S,

R* is selected from the group consisting of $(CH_2)_nSH$, $(CH_2)_nNH_2$, $CH(CH_3)OH$, $CH(CH_3)O(CO)CH(CH_3)OH$, derivatives of a polyester of citric acid, $CH(OH)(CH_2COOH)_2$, $CH_2(OH)(CO_2H)$, $CH_2COOH$, $C(OH)(H)CH_2COOH$, $CH_2C(H)(OH)COOH$, $C(OH)(H)C(OH)(H)COOH$, $(CH_2)nNHR_1$, $CH_2NR_1R_2$, $CH_2NHNH_2$, $CH_2NHOH$, $CH_2SMe$, $CHNH_2(CH_2)_n(COOH)$, $CHNH_2CH_2SMe$, $CHNH_2CH_2SSCH_2CHNH_2COOH$, $CHNH_2CH_2SO_3H$, $C_6H_4OH$, $C_6H_4COOH$, $C_6H_4NH_2$, $C_6H_4N$, $(CH_2)_nC_6H_4N$, $CH(R\#)NH_2$, $(CH_2)_n$—$SSO_3^-$, $(CH_2)_n$—S—S—$(CH_2)_n$, peptide or polypeptide, wherein $R_1$ and $R_2$ is independently selected from $C_1$–$C_4$ alkyl, wherein n is an integer in the range of 1 to 4 wherein within the same molecule n is not necessarily the same integer and wherein R# corresponds to an amino acid sidechain;

or a salt thereof.

11. A reactive dye compound having the structure:

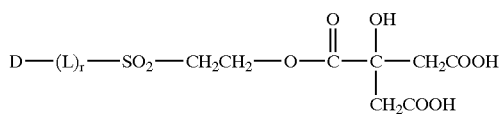

(Ib)

wherein

D is a chromophone group;

r is 0 or 1;

L is a linking group selected from the group consisting of NH, $(CH_2)_n$, N—$(CH_2)_n$N, —$(CH_2)_n$—N, NR (R is C1–C4 alkyl),

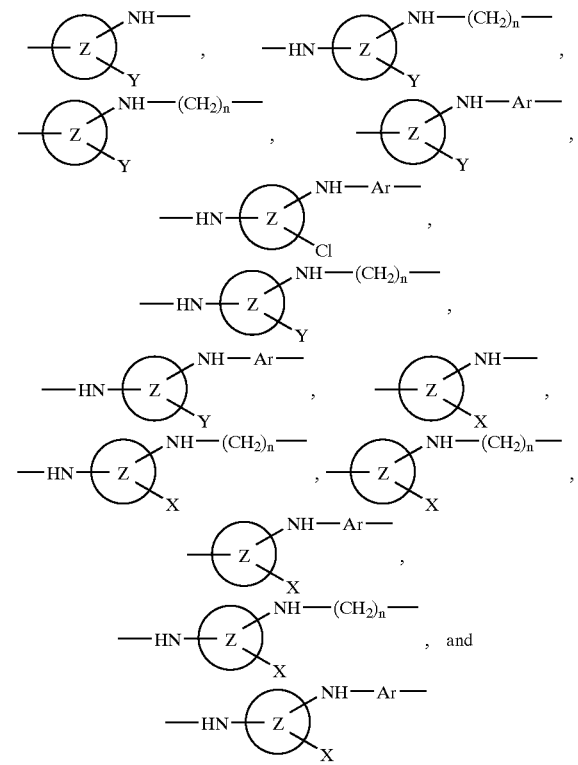

wherein

Ar is an aryl group, Y is halogen or O(C=O)R*, n is an integer of from 1 to 4, Z is a nitrogen-containing heterocycle, X is selected from the group consisting of thio-derivatives, halogens, amines, alkoxy groups, carboxylic acid groups, CN, $N_3$, and quaternized nitrogen derivatives (Q+);

A is O or S,

R* is selected from the group consisting of $(CH_2)_nSH$, $(CH_2)_nNH_2$, $CH(CH_3)OH$, $CH(CH_3)O(CO)CH(CH_3)OH$, derivatives of a polyester of citric acid, $CH(OH)(CH_2COOH)_2$, $CH_2(OH)(CO_2H)$, $CH_2COOH$, $C(OH)(H)CH_2COOH$, $CH_2C(H)(OH)COOH$, $C(OH)(H)C(OH)(H)COOH$, $(CH_2)nNHR_1$, $CH_2NR_1R_2$, $CH_2NHNH_2$, $CH_2NHOH$, $CH_2SMe$, $CHNH_2(CH_2)_n(COOH)$, $CHNH_2CH_2SMe$, $CHNH_2CH_2SSCH_2CHNH_2COOH$, $CHNH_2CH_2SO_3H$, $C_6H_4OH$, $C_6H_4COOH$, $C_6H_4NH_2$, $C_6H_4N$, $(CH_2)_nC_6H_4N$, $CH(R\#)NH_2$, $(CH_2)_n$—$SSO_3^-$, $(CH_2)_n$—S—S—$(CH_2)_n$, peptide or polypeptide, wherein $R_1$ and $R_2$ is independently selected from $C_1$–$C_4$ alkyl, wherein n is an integer in the range of 1 to 4 wherein within the same molecule n is not necessarily the same integer and wherein R# corresponds to an amino acid sidechain;
or a salt thereof.

12. Method of comprising applying thereto a compound according to claim 1 for dyeing cellulosic substrates.

13. Method of comprising applying thereto a compound according to claim 1 for dyeing wool.

14. Method of comprising applying thereto a compound according to claim 1 for dyeing polyamide substrates.

15. Method of comprising applying thereto a compound according to claim 1 for dyeing silk.

16. Method of comprising applying thereto a compound according to claim 1 for dyeing keratin.

17. Method of comprising applying thereto a compound according to claim 1 for dyeing leather.

18. Process for the preparation of a compound according to claim 1 comprising the steps of reacting a first starting material with a second starting material, the first starting material comprising at least one chromophore, at least one $SO_2C_2H_4$ which is attached to the chromophore group either directly via the sulphur atom of the $SO_2C_2H_4$ group or via a linking group L, the second starting material comprising an oxy- or thio-carbonyl group.

19. Process according to claim 18 wherein the process is carried out at a pH of from about 2 to about 8.

20. Process according to claim 18 or 19 wherein the second starting material is added to the first material slowly.

21. Product obtainable by a process according to claim 18.

22. A dye composition comprising the compound of claim 1.

23. A dye composition according to claim 22 wherein the composition is in the form of a solid mixture and further comprises an acid buffer.

24. A dye composition according to claim 22 wherein the composition is in the form of a liquid and further comprises water and an acid buffer.

25. A dye composition according to claim 22 wherein the composition is in the form of a paste and further comprises water, thickening agent and an acid buffer.

26. A dye composition according to claim 22 wherein pH is from about 2 to about 3.

* * * * *